United States Patent [19]

Ziebig et al.

[11] Patent Number: 4,710,123

[45] Date of Patent: Dec. 1, 1987

[54] EXTRUSION DEVICE FOR THE PRODUCTION OF HONEYCOMB STRUCTURES

[75] Inventors: Anton Ziebig, Ottensoos; Hans Brigasky; Willi Lewand, both of Lauf, all of Fed. Rep. of Germany

[73] Assignee: Hoechst CeramTec Aktiengesellschaft, Selb, Fed. Rep. of Germany

[21] Appl. No.: 841,320

[22] Filed: Mar. 19, 1986

[30] Foreign Application Priority Data

Mar. 21, 1985 [DE] Fed. Rep. of Germany ....... 3510181

[51] Int. Cl.[4] .............................................. A01J 21/00
[52] U.S. Cl. .................................................... 425/464
[58] Field of Search ............... 425/461, 462, 464, 463, 425/465, 466, 376 A, 381, 199; 264/177 R

[56] References Cited

U.S. PATENT DOCUMENTS

| 4,298,328 | 11/1981 | Frost | 425/466 |
|---|---|---|---|
| 4,333,896 | 6/1982 | Cunningham | 425/147 |
| 4,384,841 | 5/1983 | Yamamoto | 425/461 |
| 4,472,129 | 9/1984 | Siard | 425/376 A |

FOREIGN PATENT DOCUMENTS

| 0040052 | 11/1981 | European Pat. Off. |
| 1129343 | 10/1968 | United Kingdom. |
| 1237094 | 6/1971 | United Kingdom. |
| 1349992 | 4/1974 | United Kingdom. |
| 1405618 | 9/1975 | United Kingdom. |
| 1441514 | 7/1976 | United Kingdom. |
| 1483013 | 8/1977 | United Kingdom. |

*Primary Examiner*—Bernard Nozick
*Attorney, Agent, or Firm*—Schwartz, Jeffery, Schwaab, Mack, Blumenthal & Evans

[57] ABSTRACT

Disclosed is an extrusion device, with a die part, supported on a stationary part, having feed passageways for the plastic material on the inlet side and shaping slots, communicating with the feed passageways, on the outlet side. The die passageway for the skin of the honeycomb structure is formed by interaction of an adjustable die element with the die part on the outlet side. In the feeds of the die passageway are arranged adjustable means for regulating the flow rate of the plastic material.

2 Claims, 4 Drawing Figures

EXTRUSION DEVICE FOR THE PRODUCTION OF HONEYCOMB STRUCTURES

BACKGROUND OF THE INVENTION

The subject matter of the present invention is an extrusion device for the production of honeycomb structures from plastic material, consisting of a die part supported on a stationary part, and with feed passageways for the plastic material on the inlet side, shaping slots on the outlet side, which are connected to the feed passageways, and a die element which is adjustable by means of adjustment means and which, with the die part, forms on the outlet side the die passageway for the skin of the honeycomb structure. The die passageway is connected via feeds to the inlet side of the die part.

Honeycomb structures have a plurality of parallel flow passageways extending in an axial direction separated from one another by thin walls. The flow passageways are surrounded by a skin, which closes them off from the outside. For reasons including stabililty during the production operation, maintenance of precise diameter tolerances, and meeting technical requirements for adequate mechanical strength in assembly and in operation of the honeycomb structures, the skin must be made in a certain wall thickness, which is always greater than the thickness of the partitions between the flow passageways. Furthermore, different flow rates of the material in the skin region and in the honeycomb region are to be avoided.

According to European Patent Specification No. 0,040,052, an extrusion die is known which has on its outlet side movable recess means, by which the thickness of the skin can be influenced. What is disadvantageous is that with the recess means, which together with the die forms the die passageway for the skin, only the outlet cross-section for the material stream forming the skin can be adjusted, not the flow rate of the material itself. Thus, it is not possible to adapt the flow rate of the plastic material in the skin region to that in the honeycomb region.

SUMMARY OF THE INVENTION

Accordingly, an object of the present invention is to provide a technical design solution for an extrusion device in which, independently of the outlet cross-section of the die part forming the skin portion, the rate of the plastic material flowing there can be regulated and thus the flow rate of the material in the honeycomb region and in the skin region can be adapted exactly to each other.

The invention solves this object by providing an extrusion device for the production of honeycomb structures from plastic material, consisting of a die part, supported on a stationary part, the die part having feed passageways for the plastic material on the inlet side and shaping slots, communicating with the feed passageways, on the outlet side, and a die element, which is adjustable by means of adjustment means and, which with the die part, forms on the outlet side the die passageway for the skin of the honeycomb structure, which is connected via feeds to the inlet side, wherein adjustable means for regulating the flow rate of the plastic material are arranged downstream to the feeds of the die passageway.

The means may be arranged displaceably between the feeds and the die passageway, parallel to the flow direction of the material. They may also be arranged in the mold part so that they can be pushed into the feeds radially or tangentially to the flow direction of the material. In a particular embodiment, a breaker plate is arranged as displaceable means on the inlet side of the die part, the openings of the breaker plate being designed congruent to the feeds of the die part.

The advantages achieved by the invention are to be seen substantially in that the flow rate of the plastic material which is necessary for the formation of the skin can be changed, in particular during the extrusion operation, independently of the adjustment of the skin thickness. Thus it is possible to adapt exactly the flow rate of the material in the skin region and honeycomb region, independently of the skin thickness and/or the consistency of the material. A satisfactory joining of the skin part with the honeycomb part is thereby achieved.

BRIEF DESCRIPTION OF THE DRAWINGS

The invention is explained in more detail below in an exemplary embodiment with reference to drawings, in which.

DETAILED DESCRIPTION OF PREFERRED EMBODIMENTS

Figure 1:
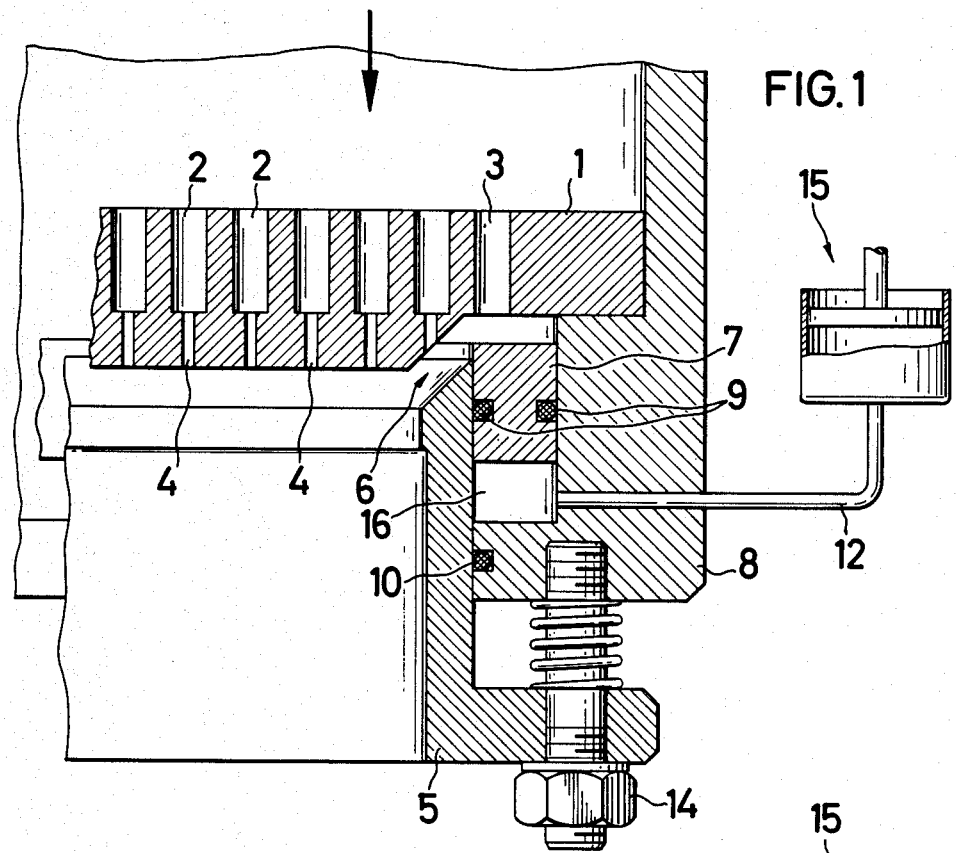
FIG. 1 shows the extrusion device according to the invention with means for regulating the flow rate of the material arranged displaceably in parallel to the flow direction of the material.

The plastic material is fed from the inlet side of the die part 1 via the feed passageways 2 to the shaping slots 4 and via the feeds 3 to the die passageway 6. The die passageway 6 is formed by the die part 1 and the adjustable die element 5. Between feeds 3 and die passageway 6 are arranged adjustable means 7 by which the flow rate of the plastic material can be adjusted. The means 7, a ring, may be adjusted mechanically, for example by means of screws, pneumatically or, as illustrated in FIG. 1, by means of a hydraulic device 15, which is in connection with the working space 16 of the means 7 via line 12, parallel to the flow direction of the material in the feeds 3.

The die part 1 is supported on the stationary part 8 of the device. The seals 9, 10 are intended to prevent plastic material being able to penetrate between the adjustable means 7 and the stationary part 8 or the die element 5. Die element 5 and means 7 are adjusted separately from each other. If ring 7 is moved closer to the feeds 3, the rate of the material flowing through the die passageway 6 decreases. Conversely, the rate increases if the ring 7 is moved away from the feeds 3. In this way, satisfactory joining of the material in the boundary layer between honeycomb part and skin part during the extrusion operation without alteration of the skin thickness may be ensured because both material streams can be adjusted to the same rate. By a corresponding design of the die element 5 determining the width of the die passageway 6, the thickness of the skin can likewise be adjusted, without interruption of the extrusion operation, by turning the adjusting nuts 14, if this becomes necessary, e.g. for reasons of maintaining certain tolerances of the diameter of the honeycomb structure.

Figure 2:
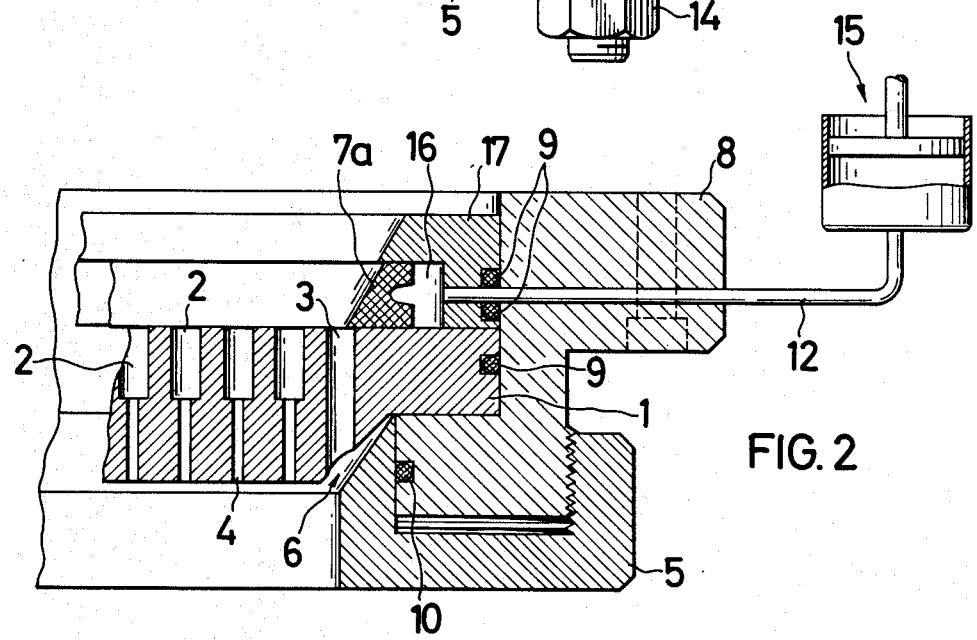
FIG. 2 shows the extrusion device but with means for regulating the flow rate of the material arranged in the die part so that they can be pushed into the feeds radially to the flow direction of the material.

In the variant in accordance with FIG. 2, the means 7a for regulating the flow rate of the material in the die part 1 are arranged such that they can be pushed into or pulled out of the feeds 3 transverse to the flow direction of the material. Suitable as drive for the means 7a are preferably hydraulic or pneumatic means. However, mechanical actuations of the means 7a are also possible within the meaning of the inventive proposal. The means 7a are held by the ring 17.

Figure 3:
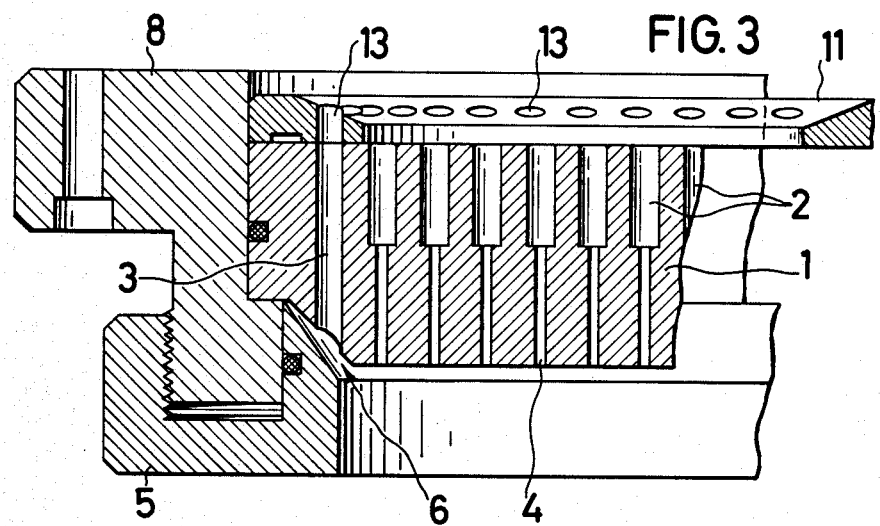
FIG. 3 shows a further variant of the device, in which a breaker plate is arranged on the inlet side of the die part as means for regulating the flow rate of the material.
Figure 4:
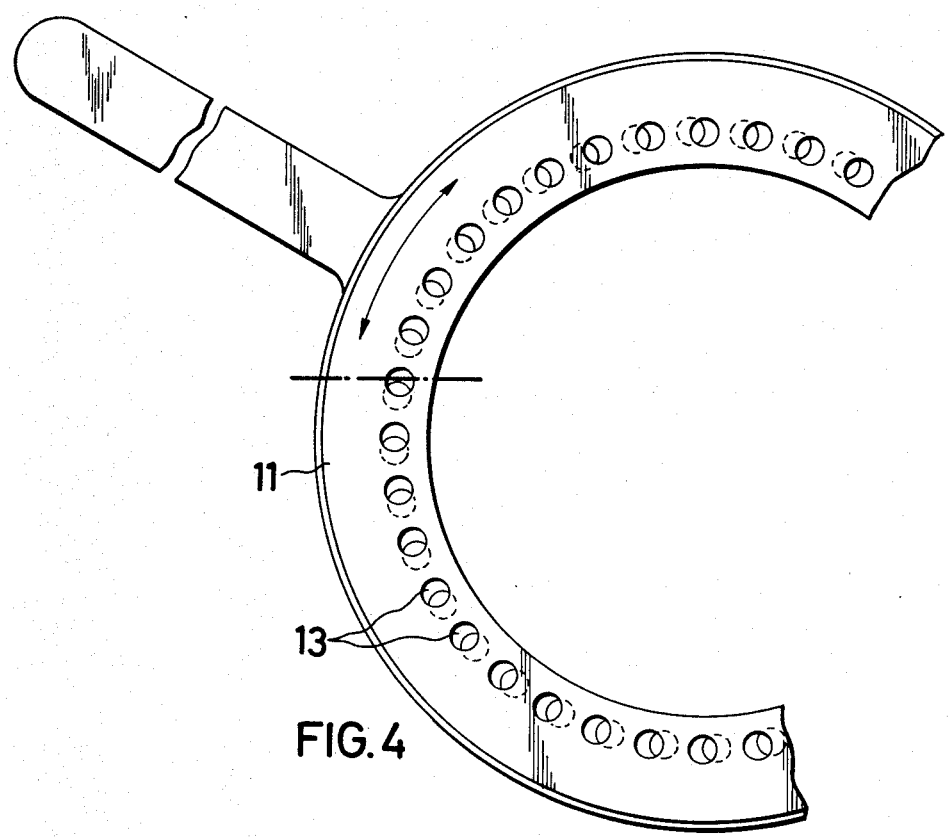
FIG. 4 shows the breaker plate from above.

In a further variant in accordance with FIG. 3, a breaker plate 11 is arranged as displaceable means for regulating the flow rate of the material on the inlet side of the die part 1, the openings 13 of which breaker plate are designed congruent to the feeds 3 of the die part 1. By turning the breaker plate 11, the cross-section of the feeds 3 can be changed and thus the flow rate of the material influenced.

We claim:

1. An extrusion device for the production of a honeycomb structure from plastic material comprising:
   a stationary frame part having a flange;
   a die part supported on the frame part, the die part having feed passageways for the plastic material on an inlet side and shaping slots communicating with the feed passageways on an outlet side;
   a die element, which with the die part forms on the outlet side a die passageway for a skin of the honeycomb structure;
   first adjustable means for adjusting the die element to vary the skin thickness; and
   second adjustable means downstream of the feeds for adjusting the flow rate of the plastic material in the die passageway.

2. An extrusion device as claimed in claim 1, wherein the second adjustable means is arranged displaceably between the feeds and the die passageway parallel to the flow direction of the plastic material.

* * * * *